Figure 1:
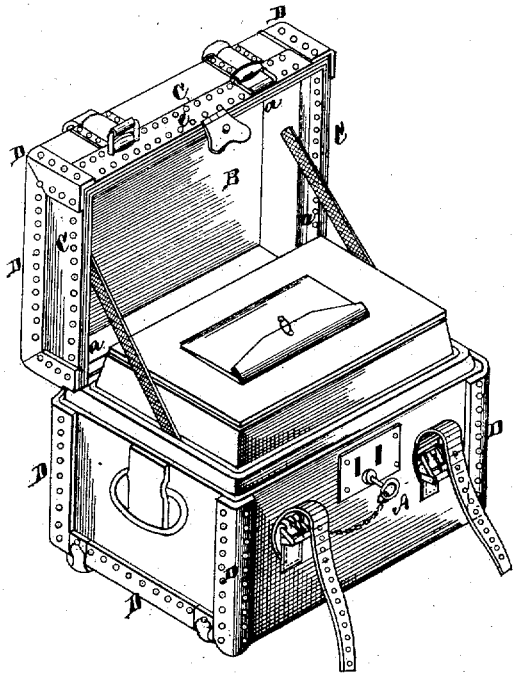

G. B. JENKINSON.

TRUNK.

No. 7,070. Reissued April 18, 1876.

Witnesses
Oliver Drake
John C. Tumbridge

Inventor.
Geo. B. Jenkinson.

N. PETERS, PHOTO-LITHOGRAPHER, WASHINGTON, D. C.

UNITED STATES PATENT OFFICE.

GEORGE B. JENKINSON, OF NEWARK, NEW JERSEY.

IMPROVEMENT IN TRUNKS.

Specification forming part of Letters Patent No. 139,158, dated May 20, 1873, reissue No. 7,070, dated April 18, 1876; application filed March 23, 1876.

*To all whom it may concern:*

Be it known that I, GEORGE B. JENKINSON, of Newark, in the county of Essex and State of New Jersey, have invented certain new and useful Improvements in Trunks, Traveling-Bags, and the like; and do hereby declare that the following is a full, clear, and exact description thereof, reference being had to the accompanying drawing and the letters of reference marked thereon, making part of this specification.

This invention relates to certain improvements in the manufacture of trunks or traveling-cases, by means of which lighter and thinner leather may be employed in their construction than has hitherto been used, without impairing their utility, but, on the contrary, rather increasing it.

The accompanying drawing fully illustrates the nature and character of my invention, in which the figure represents a trunk combining and illustrating my improvements, similar letters of reference indicating corresponding parts in the figure.

My invention consists in securing a strip of heavy leather around the valance of a trunk, and also in binding the corners of a trunk, portmanteau, valise, or the like with heavy leather firmly secured thereto, as will be hereinafter more fully set forth.

To enable others skilled in the art to which my invention appertains to make and use the same, I will proceed to describe more particularly its construction and operation.

Referring to the accompanying drawing, A represents the body of a trunk; B, the lid of the trunk, and *a* the valance around the front and ends of said lid. Ordinarily pieces of some thin material are secured on the inside, which are continually tearing off in consequence of the friction caused by opening and shutting the trunk. This difficulty, which pertains more particularly to trunks, is obviated by means of the strip C, of heavy leather, above referred to, said strip being riveted along its upper edge to the lid B, and along the lower edge to the valance *a*, substantially as shown and indicated in Fig. 1. D represents strips of heavy leather bound firmly around the corners of both the body and lid of a trunk, and riveted to the same, and burred on the inside, substantially as shown and indicated in Fig. 1.

By this mode of binding the ends or corners a great saving of stock is effected, it not being necessary to use such heavy leather all through, thereby avoiding weight and expense, and making a trunk, &c., just as durable, or more so, as if made of the heaviest material, besides utilizing the smaller pieces of stock in the said corner-strips.

Having thus described my invention, what I claim as new, and desire to secure by Letters Patent of the United States, is—

1. A traveling-case the edges of which are protected by strips of heavy leather, in the manner set forth.

2. The traveling-case provided with leather strips D, applied and secured to the corners and edges in the manner shown, substantially as and for the purpose set forth.

3. The leather strips C, secured around the valance of a traveling-case in the manner shown, substantially as and for the purpose set forth.

In testimony whereof I have signed my name to this specification in the presence of two subscribing witnesses.

GEO. B. JENKINSON.

Witnesses:

OLIVER DRAKE,
JOHN C. TUNBRIDGE.